United States Patent [19]

Rollini et al.

[11] Patent Number: 4,953,585
[45] Date of Patent: Sep. 4, 1990

[54] TUB TRANSFER-DIVERTER VALVE WITH BUILT-IN VACUUM BREAKER AND BACK-FLOW PREVENTER

[75] Inventors: Pietro Rollini, Suno, Italy; Domenic Luisi, Woodbridge, Canada

[73] Assignee: Rubinet Brass Canada Limited, Woodbridge, Canada

[21] Appl. No.: 355,011

[22] Filed: May 19, 1989

[30] Foreign Application Priority Data

Mar. 31, 1989 [CA] Canada .................................. 595350

[51] Int. Cl.⁵ ...................... F16K 11/00; F16K 24/02
[52] U.S. Cl. ..................................... 137/218; 137/119
[58] Field of Search ................................ 137/119, 218

[56] References Cited

U.S. PATENT DOCUMENTS

| | | | |
|---|---|---|---|
| 3,144,873 | 8/1964 | Moore et al. | 137/218 X |
| 3,180,352 | 4/1965 | Kersten et al. | 137/218 |
| 4,224,962 | 9/1980 | Orszullok | 137/119 X |
| 4,326,671 | 4/1982 | Goguen | 137/218 X |
| 4,589,438 | 5/1986 | Breda | 137/218 |

*Primary Examiner*—Gerald A. Michalsky
*Attorney, Agent, or Firm*—Fleit, Jacobson, Cohn, Price, Holman & Stern

[57] ABSTRACT

A transfer-diverter valve assembly is provided including vacuum breaker and back-flow prevention structure. The valve is formed as a single unit for mounting on the deck or flange of a tub, bath or similar fixture and is designed for ready installation as well as ready access to the unit for maintenance or replacement. The valve assembly includes a manually actuated diverter valve for transferring liquid flow from an inlet to one or another of multiple outlets, with a back-flow preventer/vacuum breaker valve located in an inlet flow path and actuatable by changes in fluid flow pressure and direction or atmospheric pressure. In addition, a back-flow preventer valve is located in a first outlet flow path and normally biased to close the inlet flow path, but opens in response to flow from the inlet.

5 Claims, 2 Drawing Sheets

TUB TRANSFER-DIVERTER VALVE WITH BUILT-IN VACUUM BREAKER AND BACK-FLOW PREVENTER

FIELD OF THE INVENTION

This invention is for a tub transfer-diverter valve with built-in vacuum breaker and back-flow prevention means. It is particularly useful in plumbing fixtures where diversion of fluid flow is required between a spout and a hand spray or shower. The valve assembly comprises a single unit to be mounted on the deck or flange of a tub, bath or similar fixture, thus permitting easy installation and service.

BACKGROUND OF THE INVENTION

Diverter valves have been known for some time for a variety of purposes. They are well known for use with bidets, tub-shower combinations and whirlpools. In bidets, the water flow may be diverted from the rim of the bidet to a spray outlet located towards the front of the bidet. In tub-shower combinations, diversion is from the tub spout to the shower, with the normal flow being to the tub spout. The use of back-flow preventers or vacuum breakers in such diverter valves is known in order to prevent contamination of the potable water supply. This becomes particularly important in the case of tub spout-hand shower assemblies where the hand shower may be placed in contaminated water during use.

There has already been described in U.S. Pat. No. 4,589,438 issued May 20, 1986 to Silvano Breda a diverter valve for use in a tub transfer assembly which valve comprises a main body chamber with inlet and outlet openings, a centrally disposed vertical inlet tube having a floating vacuum breaker assembly at its remote end, movable in response to changes in flow direction and pressure; the main chamber having another cylinder mounted therein with lateral openings, which openings may selectively engage the lateral outlet openings of the central chamber to permit flow thereto from an inlet opening.

U.S. Pat. No. 3,180,352 discloses an anti-siphon, non-spill valve. Water does not spill out a air vent because a combine check and float valve is used in the structure. Upper and lower valve seats are provided for the valve to ensure closure of the air vent.

A double seat valve cone is employed in a diverter assembly disclosed in U.S. Pat. No. 4,224,962 wherein flow is transferred from a tub to a shower. The valve is spring biased for flow to the tub and is designed for extremely low operating pressures. Connected parts move independently of each other through an extended valve stroke which would seem to contribute to the low pressure sensitivity of the system.

U.S. Pat. No. 4,326,671 discloses an anti-siphon valve and diverter for use in a water sprinkling system.

U.S. Pat. No. 3,144,873 discloses a dishwashing device which incorporates a diverter valve for transferring fluid flow between a spray and a spout (first and second outflow passages). The device includes a total of three back-flow prevention means or valves. The first is a flexible valve ring which is automatically sucked against a plurality of inlet bores when pressure in the inlet falls below atmospheric pressure. This places a diverter chamber, through a bypass bore and first outflow passage, in communication with atmosphere via a spout. The second check valve comprises a flared skirt or valve which expands and contracts against a wall in response to reverse flow in the device. The third check valve is located in a tube which is remote from the main assembly.

Thus, although the prior art does disclose assemblies which incorporate both diverter and back-flow or vacuum breaker means, there does not appear to be available commercially a well designed tub transfer diverter valve assembly which is reliable, easily manufactured, installed and serviced, and which also permits flexibility of installation with respect to location and variety of aesthetic finishes. In practice, such assemblies should have good flow rates without leakage through any of the back-flow or vacuum breaker means. The assembly should also include a back-flow preventer means which will permit the clearing out of standing water from the assembly when the tub spout is positioned at a point higher than the point at which the transfer valve is located. The provision of a structure combining all these functions in one unit would clearly be highly desirable from the commercial point of view, since it would help reduce inventory requirements.

SUMMARY OF THE INVENTION

Thus, the present invention provides a valve assembly comprising a main body housing having at least one fluid inlet and at least two fluid outlets, flow paths associated with each of the inlets and outlets, and passages connecting the inlets and associated flow paths to the outlets and associated flow paths, one such passage being open to atmosphere; a diverter valve for transferring flow from one inlet to one or another of the outlets and comprising a hand actuated diverter rod connected to a bicone washer biased in a first position whereby fluid flows from an inlet to a first outlet and the second outlet is closed and sealed, and on actuating the diverter rod, the bicone washer is moved to a second position where it is maintained by pressure of fluid flow from the inlet to the second outlet and the first outlet is closed and sealed, and flow thereto ceases; a back-flow preventer/vacuum breaker valve located in the inlet flow path and a connecting passage, and movable, in response to changes in fluid flow direction or atmospheric pressure, from a first position, whereby back-flow is prevented as the valve closes and seals the inlet flow path, and opens the connecting passage outlet to atmosphere, to a second position in response to fluid flow from the inlet, whereby the connecting passage outlet to atmosphere is closed and sealed against fluid flow, the valve being normally located in the first position and returnable thereto with changes in fluid flow pressure and direction or atmospheric pressure; the valve having a truncated cone shape with an upper flange, guide means on each valve end and sealing means at each end to engage valve seats at the upper and lower limits of the path of travel of the valve; a back-flow preventer valve located in the first outlet flow path movable from a first position in which the valve is normally biased, whereby the inlet flow path is closed and sealed against flow, to a second position in response to fluid flow from the inlet path, the valve being of spindle-like shape with a whorl-like base having guide means and sealing means associated with it, and upper valve seat means to engage the valve sealing means.

Generally, the valve assembly will comprise one fluid inlet and two fluid outlets. The fluid inlet may be attached to separate hot and cold water supplies or a mixed supply line. The outlets preferably comprise a tub spout and a hand shower, but a wall shower could also be connected either in preference to the hand shower or in addition to the hand shower. In the latter instance, the assembly would require three outlets or an additional diverter device to be added to the shower.

The design of the diverter valve is such that it comprises the rod which may be hand actuated and a bicone washer at the lower end of the rod. Biasing means, preferably spring means are mounted on the rod to maintain the rod and hence the diverter valve in the first position. The diverter valve includes first sleeve means to retain the rod and biasing means within the assembly, second sleeve means which include an upper valve seat for the bicone washer and an outlet and associated passage leading to the connecting passage and associated second outlet of the assembly. Sealing means are provided between the first and second sleeve means to prevent flow above the second sleeve means and additional sealing means are provided to prevent flow from the outlet of the second sleeve means to any other part of the assembly but to the second outlet thereof.

On depressing the rod of the diverter valve, the spring is compressed and the valve moves down from its first position to its second position where the lower portion of the bicone washer contacts the lower valve seat provided in the housing and seals off the outlet to the tub spout, while at the same time opening the outlet to the hand or wall shower or both. The size of the bicone washer and the channel in which it moves from its first and second positions are selected so that the valve moves easily up and down in the channel and the washer and associated valve seat means are such that a reliable and effective seal is created therebetween. It should be noted that the passages, inlets and outlets in the assembly are sized such that substantial flow rates are achieved throughout. Hence, in use the assembly permits one to fill quickly a tub or bath or similar fixture. In addition, the flow rate ensures that when the bicone washer of the diverter valve is depressed into the second position, the pressure of the fluid flow or water flow is such that the bicone valve remains in that position until water flow ceases, which may be accomplished by turning off the fluid or water source.

The back-flow preventer/vacuum breaker valve located in the inlet flow path lies within a channel in the housing of the valve assembly and is sized and shaped for reciprocal up and down movement within the channel or path. Preferably the valve itself is a particular shape, namely a truncated cone shape with an upper flange portion. Its upper and lower ends each include sealing means and guide means, the latter being preferably triradial vanes and of a length such that, when the valve is in the upper position, the ends of the vanes remain within the lower portion of the passage in the valve housing body. This ensures that when the valve has to move to its second or lower position, it does so smoothly and reliably. The same is true for the vanes which comprise the upper guide means. The limits of travel of this particular valve are determined by the positions of the valve seats. The vane structure and the truncated cone and flange structure of the main body portion of the valve are such that valve response occurs quickly and reliably. The truncated shape is particularly advantageous when fluid flow is initiated by turning on the water supply and water enters the inlet and associated inlet flow passage of the valve assembly. The truncated shape provides a large surface area for the water to push against and hence the change in position of the valve is immediate and effective. Seal is assured everytime and hence the assembly remains watertight in the circumstance where fresh water is introduced into the assembly, and ensures that no back-flow occurs into the potable water supply when reverse flow is set up.

The back-flow preventer valve located in the first outlet flow path is biased by means of a spring into a first position whereby back-flow through the flow path or passage is not permitted. The spring is selected so that once water is turned on and flow commences through this outlet, the pressure of the water is sufficient to move the valve to a second position, hence compressing the spring. The valve remains in this position permitting flow through the assembly until the flow is cut off. This valve is spindle-shaped with a set of upper guide vanes, preferably four in the shape of a cruciform, with the spindle being of such length that when the valve is in the open or lower (second) position, the vanes permit the valve to remain upright. The base of the valve is fluted and includes a recess for receiving the spring. The valve is contained within a sleeve or cylinder which threadingly engages an aperture in the main body of the assembly. The sleeve or cylinder serves to bias the valve into its normal closed position. In this way the valve is able to quickly and reliably return to its closed or first position in which it is normally biased via the spring. The spindle-shape and the vanes ensure good flow rates through the assembly since they permit the valve to remain in a secure upright position within the passage or channel, thereby providing smooth and reliable operation. In addition, the shape is such that the valve quickly responds to any water or spring pressure on it and hence the valve action or movement is immediate and positive. Sealing means are provided on the upper portion of the whorl-like base which act in concert with seating means located at the lower edge of the channel portion of the body in which the guide vanes move.

The valve assembly body comprises a main body portion in which the various passages, paths or channels are located. Over this is found a decorative cover which may be of brass or any desired material or shape. It is sized such that sealing means located at the outer surface portions of the main body housing serve to provide a seal between the two parts. An opening is provided in the top portion of this covering which provides the vent to atmosphere for the valve assembly.

The main body portion includes a closing top portion which includes the top portion of the vacuum breaker/back-flow preventer valve which is open to atmosphere, providing the vent for the assembly. The top includes means, preferably set screws by which it is secured to the body. In addition, there is an aperture or bore for the hand activated diverter rod. The decorative cover is mounted over the housing after this closing piece is put in place. Sealing means are associated with this top closure portion to ensure that the assembly remains watertight. The exterior of this closure portion includes sealing means which engage the inner surface of the outer decorative flange or covering. This ensures a further seal against leakage for the assembly.

Finally, the structure includes a flange handle or escutcheon which is mounted on the top of the last mentioned cover and which includes an aperture and securing means, preferably a set screw for the diverter rod. A spring cap may be placed on the top of this flange handle or escutcheon to close it off. Thus, it can be seen that assembly and disassembly of the unit is relatively easily accomplished and access to all components is excellent. The assembly is of course provided with mounting means for securing it to a plumbing fixture, such as a tub or whirlpool or sink or basin.

The valve assembly is normally made of brass, although other conventionally known materials may be substituted. All sealing means, i.e., O-rings, washers and the like are preferably made of silicon or rubber materials. The back-flow preventer/vacuum breaker valve and back-flow valve are preferably made from light and durable materials. ABS is a good choice for such a material, although other conventionally known materials may be selected.

BRIEF DESCRIPTION OF THE DRAWINGS

In the accompanying drawings which are meant to illustrate the invention,

FIG. 2 is a longitudinal cross-section of the valve drawn through line 2—2 of FIG. 1a;

FIG. 3 is a longitudinal cross-section of the valve drawn through line 3—3 of FIG. 1a;

FIG. 4 is a longitudinal cross-section of the valve drawn through line 4—4 of FIG. 1a.

DESCRIPTION OF THE PREFERRED EMBODIMENTS

Figures 1, 1A:
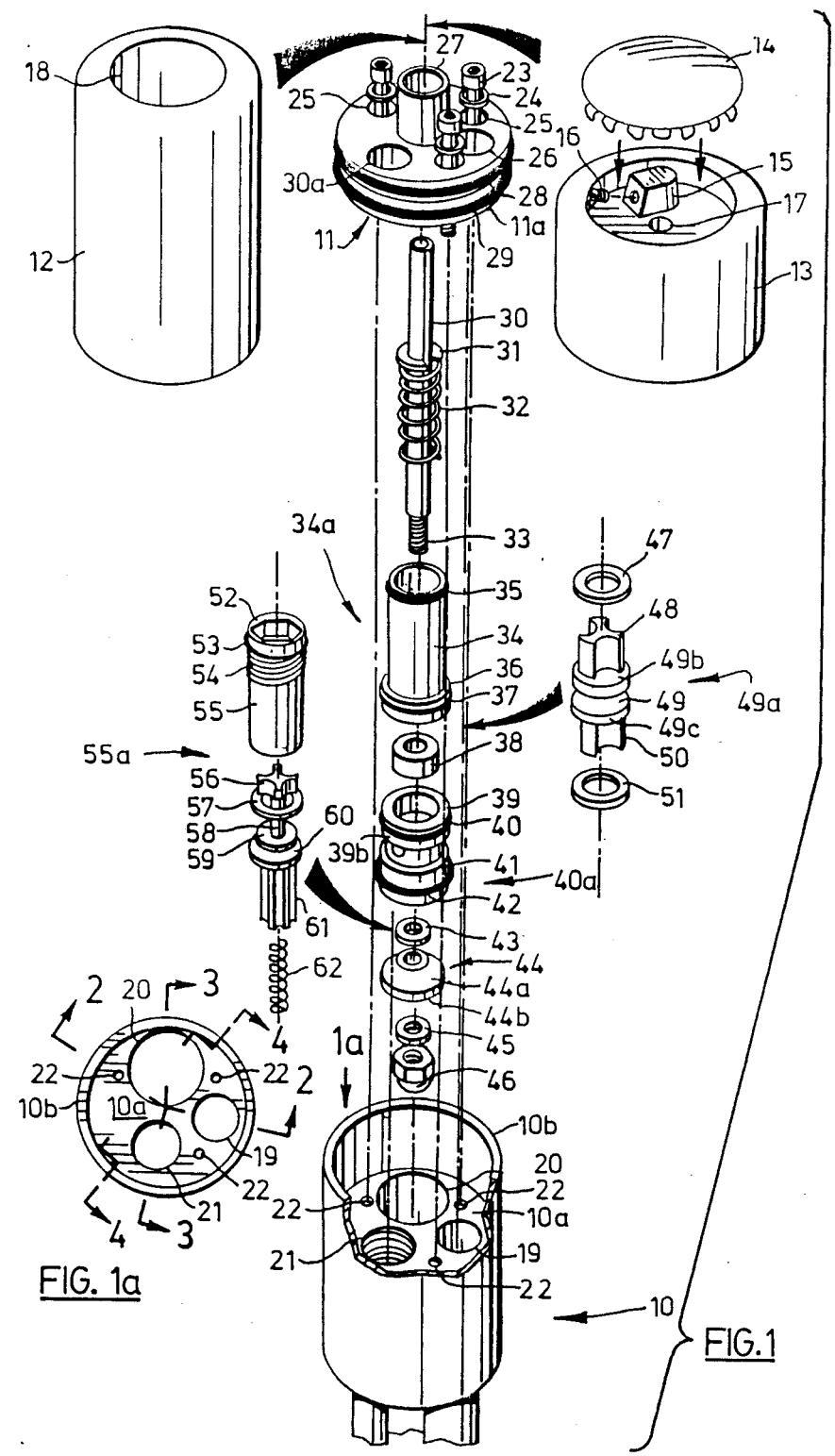
FIG. 1 is an exploded perspective view of a tub transfer-diverter valve assembly according to the present invention.
FIG. 1a is a top view of the interior of the valve housing with section lines shown thereon for subsequent figures of the drawings.
Figure 1:
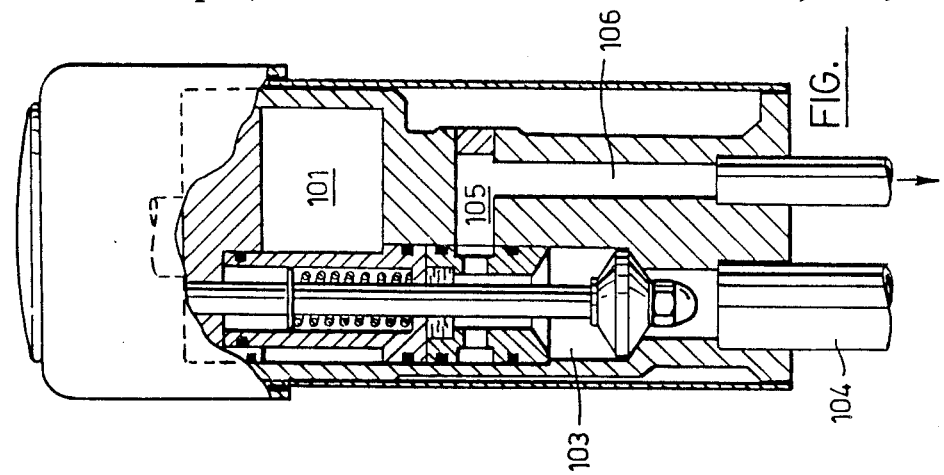

Referring now to FIG. 1 of the drawings there is illustrated main body housing 10 which is of solid cylindrical shape, a top surface 10a, is seen in cut-away view. In this surface, there can be seen a number of apertures including interiorly screw threaded apertures 22, a substantially larger interiorly screw threaded aperture 21 and two smooth surfaced apertures 19 and 20. The top of the body includes an upstanding hollow cylindrical portion 10b.

The assembly includes a closure 11 for the main body housing 10; a main body housing cover 12; and a decorative escutcheon 13, which serves as a handle to actuate a diverter rod 30. Closure 11 for the main body housing 10 includes O-rings 28 and 29 located on its circumferential surface 11a, which seal the housing against fluid flow and leakage and sealingly engage the side and top of the cylindrical portion 10b of the main body housing 10. Closure 11 includes an upstanding cylindrical portion 27 which functionally engages a mating cylindrical projection located inside decorative escutcheon 13 (see FIG. 2), aperture 30a which receives diverter rod 30 and aperture 26 which provides the atmospheric opening for the main body housing. Set screws 23 and associated washers 24 are shown in apertures 25 with the set screws 23, on assembly engaging the apertures 22 of the main body housing. When these set screws are tightened, the closure seals the main body housing 10 against leakage. Over the top of closure 11, main body housing cover 12 is placed, which contains an aperture 18 through which the top of the diverter rod is received and which provides the vent to atmosphere for opening 26. Over the top of the cover 12, decorative escutcheon 13 which acts as a handle for the diverter rod 30 is placed. The escutcheon is secured to the top of the diverter rod by means of a set screw 16.

The top of the diverter rod is placed in a hollowed out portion of projection 15 which appears in the top part of the escutcheon or handle 13. Cylindrical projection 27 frictionally engages a similar cylindrical projection (see FIG. 2) in the interior of escutcheon 13.

Decorative escutcheon and handle 13 are provided with a spring cap which closes off the mounting for the handle. It will be obvious from the drawing and this description that many choices can be made for the escutcheon or handle and thus any type of material and shape of handle can be used in this particular assembly, thereby ensuring that the assembly will find application in many settings and can be mated with many different types of plumbing fixtures. This is particularly attractive from the inventory point of view since it permits one basic assembly to be kept in stock with a variety of escutcheons or handles to be used therewith.

The lower end of diverter rod 30 includes a screw threaded portion 33. On the main part of the rod 30, there is located a spring 32 and retainer ring 31. This assembly fits inside a cylindrical sleeve 34a which is provided with O-rings 35 and 37. The O-rings are located at the top and bottom, respectively of the sleeve. O-ring 37 is located on an enlarged flange portion 36 on the sleeve, the diameter of which matches the diameter of aperture 20 into which the whole diverter valve assembly fits (in frictional engagement) in the main body housing 10. The aperture through cylindrical sleeve 34 is such that it is larger at the top end, and of a size which accommodates the spring and retaining ring 31. The aperture near the bottom of the sleeve is reduced so that it is similar in size to the diameter of the diverter rod. Sealing means, preferably a washer 38 is located in a seat (see FIG. 3) in the base of the sleeve 34. The sealing means, washer 38 ensures that no water travels up through the sleeve, and hence out of the top of the assembly. The reduced diameter of the interior of the sleeve provides a stop for the spring against which it can be compressed. Another sleeve 40a comprising enlarged top and bottom portions 39 and 41, respectively, each of which carries O-rings 40 and 42, respectively, center portion 39a is located below the first cylindrical sleeve 34. The diameters of enlarged portions 39 and 42 are identical to the diameter of portion 36 of the upper sleeve. Thus the respective O-rings 35, 37, 40 and 42 engage the surface of the respective parts of the passage or channel or paths with which they are in contact to seal the passage or channel or path, and hence provide an assembly which does not leak. The narrower portion 39a of the sleeve 40a includes an aperture 39b. The aperture opens into the sleeve and together with the narrower sleeve portion 39a provides a passage which connects, on assembly, to the second outlet of the assembly which is preferably connected to a hand or wall mounted shower. A bicone valve 44 is located beneath lower sleeve portion 40a, with brass washers 43 and 45, located adjacent its upper and lower surfaces 44a and 44b, respectively. The upper surface 44a engages a valve seat 44aa within the base of sleeve 40a, the seat being shaped and sized to receive the top of the cone in a manner which provides a seal. A retaining nut 46 is found at the lower part of the diverter rod assembly and this is screwed onto the threaded portion 33 of the rod and secures all of the parts of the diverter valve together. The lower valve seat 44bb for the bicone valve is found in the base of the aperture 20 in the main body housing 10. It is again sized and shaped to ensure that a seal is created between the face 44b and the base of aperture 20. The passage with aperture 20 is sized to accommodate the diameter of the flange 36 or sleeve 34a and the enlarged portions 39 and 41 of the lower sleeve 40a so that the associated O-rings 37, 40 and 42 form a seal against the surface of the passage. The upper part of sleeve 34 and O-ring 35 are received within a valve seat associated with aperture 30a which is not shown since it is formed in the bottom surface of closure 11.

Back-flow preventer valve and vacuum breaker 49a is located in aperture 19 of the main body housing 10. The valve includes a spool shaped valve 49 which has upper and lower flanges 49b and 49c, respectively. These are sized so that the valve may operate smoothly in the aperture 19, moving easily up and down within it. Washers 47 and 51 are provided at the top and bottom of the assembly and these sit on the top and bottom surfaces of flanges 49b and 49c, respectively. Triradial vanes 48 and 50 are located at the top and bottom ends of the spool 49. These vanes provide guide means to ensure that the valve remains aligned and upright within the aperture 19 and associated passage. The shape of the valve is such that changes in water flow direction and atmospheric pressure easily result in movement of the valve in one direction or the other. The valve is located in the passage associated with aperture 19, which is the potable or fresh water inlet to the assembly.

Back-flow preventer valve 55a comprises a cylindrical sleeve portion 55 which is hollow and is provided with external screw threads and sealing means, preferably an O-ring 53 which helps secure the valve within the aperture 21. The internal screw threading of aperture 21 engages the external screw threads 54 of the cylindrical sleeve. The top of the cylindrical sleeve is formed into a hexagonal nut or other suitable shape, which permits one to insert and remove the sleeve easily, and also serves as a stop for the upper limit of travel of the valve. The valve itself comprises a spindle 58 and a whorl-like base 59. The top of the spindle is provided with four vanes in cruciform shape which help guide the valve in its movement through the passage or aperture 21, which is formed once the sleeve 55 is in place in the body housing 10. An enlarged flange portion 60 is located at the base of the spindle 58, on which a washer 57 sits thereby providing a seal. Attached to the enlarged flange portion 60 is guide means 61 which is of cylindrical shape, the outer surfaces of which are fluted to permit passage of water or air to facilitate movement of the valve once in place. Thus guide means 61 includes bottom opening or recess for receiving a spring 62 which biases the valve in a closed position. This valve is located in the outlet to the tub spout, i.e. the main outlet of the assembly. The spring is selected so that it can be compressed easily by the pressure of flow of water through the outlet.

Figure 3:
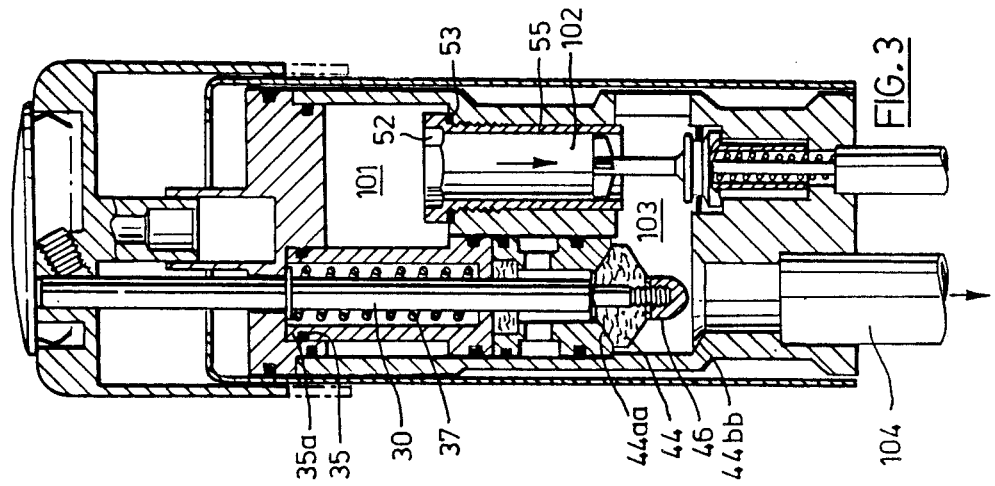
Figure 2:
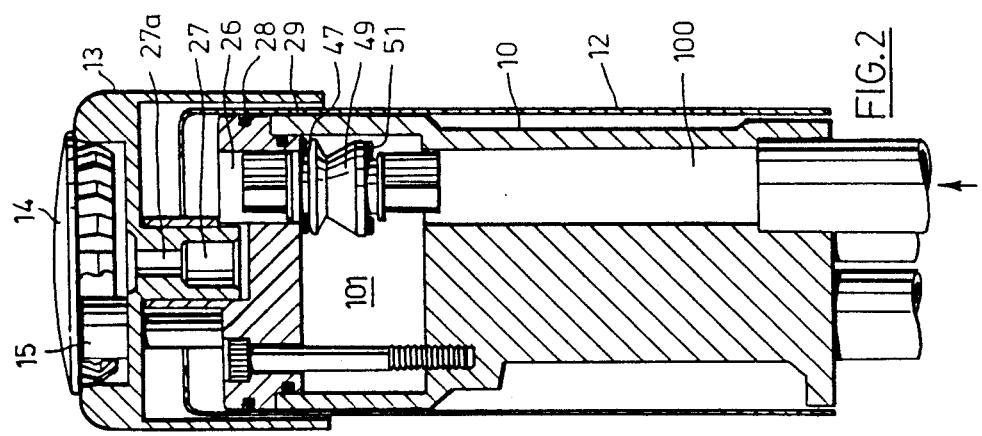

Reference should now be made to FIGS. 2, 3 and 4 which illustrate cross-sections through the complete assembly as noted earlier. In FIG. 2, the back-flow preventer/vacuum breaker valve 49a is shown at its upper position wherein the vent to atmosphere is closed and flow is permitted of potable or fresh water into the system. The valve 49a is located partly in inlet passage 100 and partly in connecting passage 101. Its path of travel is limited by the upper and lower surfaces of connecting passage 101 which provide upper and lower valve seats respectively, against which washers 47 and 51 push to provide either a seal for the inlet 100 or the atmospheric vent on outlet 26.

In FIG. 3, the diverter valve is in its normal position and the back-flow preventer valve in the tub spout outlet path 102 and connecting passage 103 is shown in open position, as it would be when compressed by flow of water through the assembly from connecting passage 101 through to tub spout outlet 104.

FIG. 4 shows the diverter valve in closed position or second position, whereby flow to the tub spout outlet is prevented and flow to the alternative outlet which may be a handspray or wall mounted shower is permitted. Thus in this position, water flows from inlet 100 into connecting passage 101, then through passage 102 into connecting passage 103, where it then flows around the top 44a of bicone valve 44 and up through the now open sleeve 40a where it exits out of aperture 39b into connecting passage 105 and into outlet 106 flowing to a hand shower or other device (not shown). Flow further up the sleeve 40a is prevented by the combination of washer 38 and the O-rings 37, 40 and 42 and their respective sealing surfaces or seats.

Thus, it will be seen that the valve assembly provides a flexible unit which is designed for reliable, smooth operation. It is easily manufactured and assembled. Installation is simple to accomplish as is maintenance. The replacement of parts is facilitated by the ready access to all parts of the assembly. The sealing means and the shapes of the valves all ensure positive and smooth valving action. Flow rates are excellent through the assembly.

The scope of the present invention should not be unduly limited by the choice of particular terminology. Equivalent or generic terminology may be substituted where appropriate.

Many changes may be made to the embodiment of the invention illustrated and described herein without departing from the spirit of the invention. The claims should not be limited unduly to the illustrated and described embodiment.

The embodiments of the invention in which an exclusive property or privilege is claimed are defined as follows:

1. A valve assembly comprising a main body housing having at least one fluid inlet and at least two fluid outlets, flow paths associated with each of the inlets and outlets, and passages connecting the inlets and associated flow paths to the outlets and associated flow paths, one such passage being open to atmosphere; a diverter valve for transferring flow from one inlet to one or another of the outlets and comprising a hand actuated diverter rod connected to a bicone washer biased in a first position whereby fluid flows from an inlet to a first outlet and the second outlet is closed and sealed, and on actuating the diverter rod, the bicone washer is moved to a second position where it is maintained by pressure of fluid flow from the inlet to the second outlet and the first outlet is closed and sealed, and flow thereto ceases; a back-flow preventer/vacuum breaker valve located in the inlet flow path and a connecting passage, and movable, in response to changes in fluid flow direction or atmospheric pressure, from a first position, whereby back-flow is prevented as the valve closes and seals the inlet flow path, and opens the connecting passage outlet to atmosphere, to a second position in response to fluid flow from the inlet, whereby the connecting passage outlet to atmosphere is closed and sealed against fluid flow, the valve being normally located in the first position and returnable thereto with changes in fluid flow pressure and direction or atmospheric pressure; the valve having a truncated cone shape with an upper flange, guide means on each valve end and sealing means at each end to engage valve seats at the upper and lower limits of the path of travel of the valve; a back-flow preventer valve located in the first outlet flow path movable from a first position in which the valve is normally biased, whereby the inlet flow path is closed and sealed against flow, to a second position in response to fluid flow from the inlet path, the valve being of spindle-like shape with a whorl-like base having guide means and sealing means associated with it, and upper valve seat means to engage the valve sealing means.

2. A valve assembly as claimed in claim 1 wherein the assembly comprises one fluid inlet and two fluid outlets and associated passages.

3. A valve assembly as claimed in claim 2 wherein the diverter valve comprises the rod, a bicone washer at the lower end of the rod, biasing means for the rod to maintain the valve in the first position, first sleeve means for retaining the rod and biasing means, second sleeve means for the rod which include an upper valve seat for the bicone washer and an outlet and associated passage to the connecting passage and associated second outlet of the assembly; sealing means between the first and second sleeve means to prevent flow above the second sleeve means; and additional sealing means provided on the first and second sleeve means to prevent flow from the outlet of the second sleeve means to any other part of the assembly but to the second outlet thereof.

4. A valve assembly as claimed in claim 3 wherein the lower valve seat for the bicone washer is provided by a correspondingly shaped seat in the base of the aperture or passage in which the diverter valve is located.

5. A valve assembly as claimed in claim 4 wherein the back-flow preventer valve located in the first outlet flow path comprises a sleeve or cylinder which threadingly engages an opening in the main body housing whereby the valve is secured therein and biased in its normal closed position, and sealing means are associated with the sleeve or cylinder to prevent leakage when back-flow occurs.

* * * * *